No. 852,197. PATENTED APR. 30, 1907.
R. S. PEASE.
METHOD OF DRAWING GLASS.
APPLICATION FILED JUNE 21, 1906.
2 SHEETS—SHEET 2.
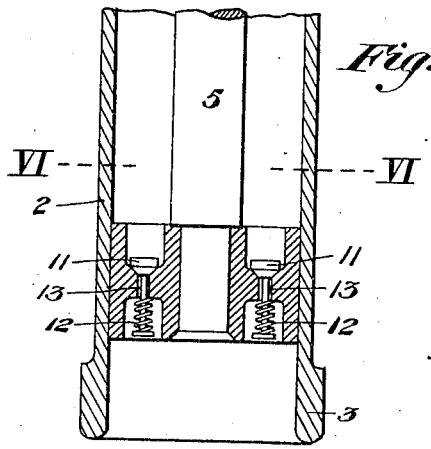
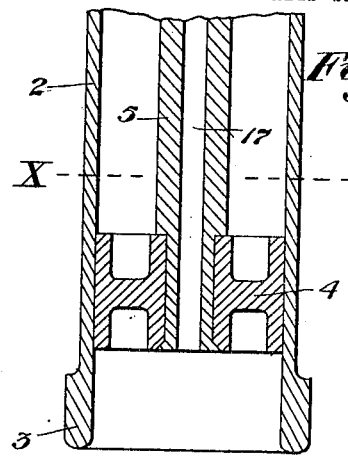
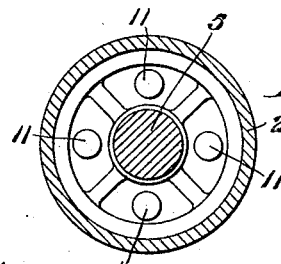
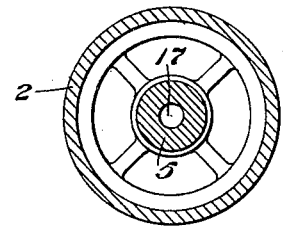
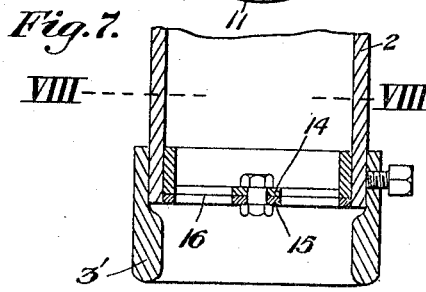
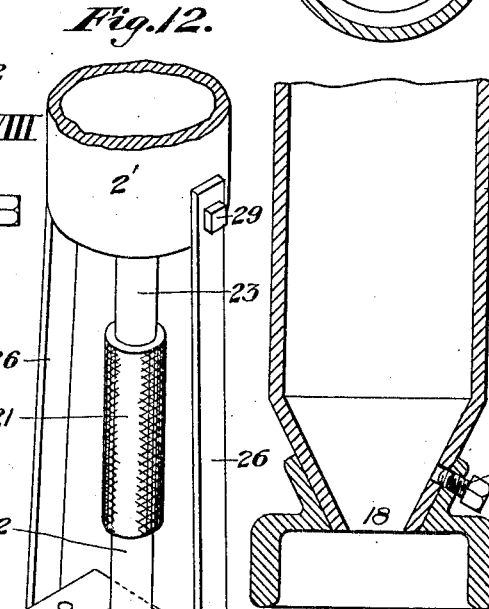
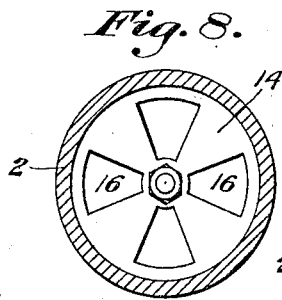
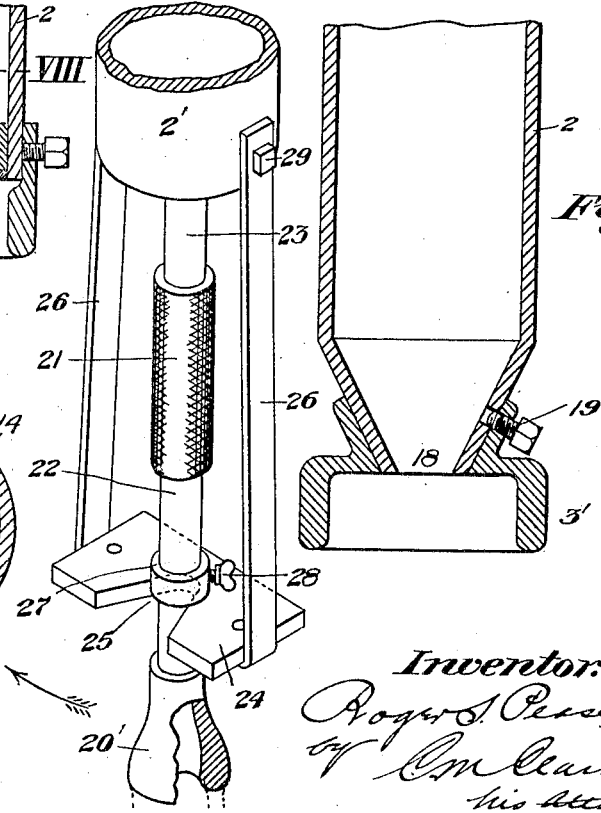
Witnesses:
E. R. Rodd.
Chas. S. Sipley.
Inventor:
Roger S. Pease
by C. M. Clarke
his attorney

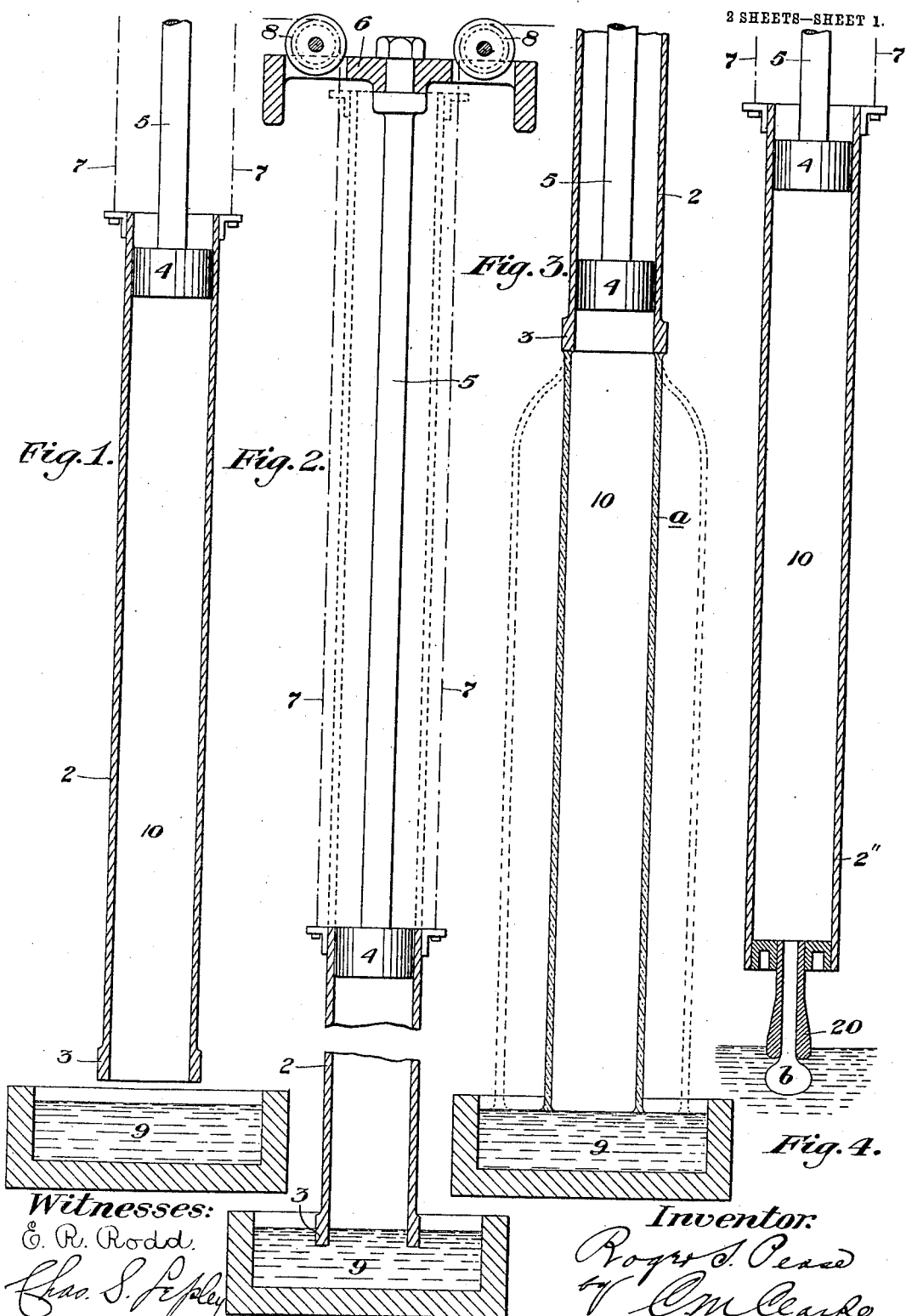

UNITED STATES PATENT OFFICE.

ROGER S. PEASE, OF ALLEGHENY, PENNSYLVANIA, ASSIGNOR TO ALFRED M. LEE, TRUSTEE, OF PITTSBURG, PENNSYLVANIA.

METHOD OF DRAWING GLASS.

No. 852,197.     Specification of Letters Patent.     Patented April 30, 1907.

Application filed June 21, 1906. Serial No. 322,671.

*To all whom it may concern:*

Be it known that I, ROGER S. PEASE, a citizen of the United States, residing at Allegheny, in the county of Allegheny and State of Pennsylvania, have invented certain new and useful Improvements in Methods of Drawing Glass, of which the following is a specification, reference being had therein to the accompanying drawing.

My invention relates to the drawing of glass cylinders or hollow glass articles from a bath of molten glass and is designed to provide an improved method whereby commercial rollers or other hollow glass articles may be produced.

To that end the invention consists in utilizing an inclosed column of air or other gaseous fluid in the interior of a cylinder, the lower end of which acts as or is provided with a bait adapted to be immersed into the bath of molten glass and to draw the cylinder therefrom, the upper end of the cylinder being closed by a stationary air opposing abutment around which the cylinder is drawn upwardly. The inclosed air, remaining stationary during the drawing operation, and expanding by the heat radiated from the mass of molten glass, and from the article being drawn, provides an interior pressure to maintain the cylinder in the desired form.

In carrying out the invention, any suitable means may be employed whereby a cylindrical or other form of bait may be lowered on the batch, and whereby the contained column of air will be maintained in a relatively stationary position, vertically, during the operation so as to utilize its expansive quality or force.

In the drawings, which show one form of apparatus. Figure 1. represents a central vertical section of the bait cylinder, previous to being immersed in the glass. Fig. 2. is a similar view showing the bait immersed in the glass, and illustrating the lifting and abutment supporting construction. Fig. 3. is a view similar to Fig. 1 showing the bait raised and the cylinder depending therefrom, previous to its severance from the molten metal. Fig. 4. is a similar sectional view showing a modified form of bait, and illustrating the initial effect of the interior expanding air. Fig. 5. is a vertical sectional detail view on an enlarged scale showing means providing for escape of excess rarefied air. Fig. 6. is a horizontal sectional view on the line VI. VI. of Fig. 5. Fig. 7. is a vertical sectional detail view of the lower end of the bait cylinder, showing it provided with a detachable bait and damper mechanism for controlling the radiating circulation. Fig. 8. is a cross sectional view on the line VIII. VIII. of Fig. 7. Fig. 9. is a view similar to Fig. 5, but showing a hollow abutment support. Fig. 10. is a cross section on the line X. X. of Fig. 9. Fig. 11. is a vertical sectional detail view of the lower end of the bait cylinder, providing a contracted orifice. Fig. 12. is a detail view showing a further modification.

In carrying out my invention I employ a bait cylinder 2, the lower terminal 3 of which may be reinforced as shown or of any other construction, either integral or otherwise, adapting it to act as a bait for the glass.

4 is a stationary abutment, preferably in the form of a plunger or piston head, adapted to make an air-tight sliding joint within the cylinder 2 to prevent escape of the contained air. Abutment 4 is supported in any manner desired as by a rod or other means 5 depending downwardly from any suitable frame 6, and the cylinder 2 is arranged to be raised by any convenient means, as by cables or other suitable supporting devices 7, 7, passing around sheaves 8, 8, and actuated by a winding drum or other means. It will be understood that the rate of movement of cylinder 2 may be readily controlled and graduated to suit the work by arranging the lifting mechanism to operate at the desired speed, either regular or variable. The cylinder 2 will ordinarily lower by gravity, but if necessary may be positively lowered by any proper mechanism. Abutment 4 may be packed by rings, cups or otherwise, but good results may be had by wool packing to insure continuous effective results in maintaining an air-tight joint and resisting the effect of heat.

The molten glass may be contained in any suitable receptacle as a pot 9, which may be permanent or movable, into which the glass may be ladled or charged from a tank or otherwise, and it will be understood that the operation of the invention is in no way dependent on the construction or character of the glass receptacle.

Bait 3 having been lowered upon the surface of the molten glass, and preferably immersed therein for attachment, it will be seen that the cylindrical body of air contained in the space 10 will be sealed therein, and that the immediate effect of the heat radiated from the molten glass will be to raise the temperature of said air, causing it either to expand or increase in pressure, or both. Upon slowly raising the bait cylinder 2 and adhering cylinder $a$ of glass, the abutment remaining stationary, cylinder 2 and glass cylinder $a$ will be raised around the contained relatively stationary column of air, which column of air, in the progress of the operation, will gradually become surrounded by the glass cylinder, as indicated in Fig. 3. The effect of such relative transposition of the cylinder 2 and cylinder $a$, will be to utilize the expansion or increased pressure of the column of air against the interior walls of glass cylinder $a$, whereby it will be maintained at the desired diameter, as shown in Fig. 3, uniform with the diameter of the bait, or of an increased diameter, as indicated in dotted lines, depending upon the proportions of the parts, the heat of the glass, its rate of drawing, thickness, or other conditions present or within the control of the operator.

In order to provide means for escape of excess air, the abutment 4 may be provided with one or more check valves 11 (Fig. 5) under control of spring 12 and adapted to open at the desired pressure to admit of escape of air through the valve-controlled port 13. It will be understood that these valves may be delicately adjusted by suitable spring pressure regulating devices so as to open when the desired pressure has been reached to prevent undue expansion of the cylinder, and to automatically close when the interior pressure has been sufficiently reduced. If desired also suitable damper mechanism may be employed as illustrated in Fig. 7 by means of a stationary disk 14 and a movable disk 15 having apertures adapted to provide registering openings 16 of greater or less area, capable of exact adjustment. By such means the upward circulation of the heated air or fluid through the main body of the contained fluid cylinder may be controlled and nicely adjusted, if necessary.

Should it be found that a surplus of air is required to supplement the expanded original column, the rod 5 may be made hollow as indicated in Fig. 9, supplied with an internal longitudinal port 17 by which air may be furnished to the interior of the cylinder, from any desired compressing mechanism and subject to suitable valve control, although ordinarily such supplemental air will not be required for cylinders of the usual diameter.

In Fig. 11 I have shown the cylinder 2' as contracted at its lower end, providing a reduced orifice 18 whereby the circulation of the expanding fluid may also be throttled, and in such construction as well as in that shown in Fig. 7, the bait 3, may be of any suitable form or diameter, and secured to the lower end of the bait cylinder by any convenient means, as a set screw 19.

In Fig. 4 I have shown the cylinder 2'' provided with a drawing bait 20 of reduced diameter similar to an ordinary blow pipe and adapted to be immersed in the molten glass and to draw a cylinder therefrom by first forming a comparatively small neck, the cylinder then being expanded laterally to the desired diameter, by interior pressure. The preliminary initial effect in all similar blowing operations, is to depress the surface of the glass within the area of the bait, chilling the surface and forming an adhering film, in the form of a bubble $b$. The upward drawing of the bait produces an extension of such film which chills by exposure to the inside and outside fluid or air, resulting in the finished cylinder. If it is desired to draw the cylinder to a point at the bottom for severance, the interior pressure may be reduced at the proper time by merely raising the abutment 4, and any suitable means may be devised for such purpose. It will also be understood that the pressure within the glass cylinder may be increased by moving the abutment 4 downwardly and it will thus be seen that the interior pressure may be easily and accurately regulated, to decrease or increase, by either raising or lowering the abutment within the cylinder. If desired, the bait 20 may be flexibly connected with the cylinder, thereby allowing the glass cylinder to be lifted to horizontal position for removal or further treatment, and in Fig. 12 I have shown a construction in which the bait 20' is connected with the cylinder 2' by means of an intervening flexible hose connection 21 of sufficient length to permit free deflection of the depending connected sections of tubing 22 relative to section 23. For the purpose of supporting the weight of the bait of the cylinder-in-process depending therefrom, I preferably employ a supplemental supporting frame of any suitable construction, which may consist of a transverse plate 24 having a laterally arranged receiving socket 25, preferably tapered as shown to admit of free insertion and removal, said plate being supported below cylinder 2' by any suitable means, as depending links 26. Stem 22 is provided with a surrounding supporting abutment 27 and may be conveniently in the form of a ring having a thumb screw 28, whereby it may be adjustably set in the desired position. The supporting frame may likewise be pivoted upon bolts 29 at each side of the cylinder so that the frame itself may be swung outwardly. With such construction it will be seen that by reason of the flexible connection 21, the finished cylinder may be readily swung out horizontally, the bait following the line of direction indicated by the arrow, thereby facilitating the removal of the cylinder.

The operation of the invention will be readily understood from the foregoing description. The glass cylinder may be drawn to the desired length, and then severed from the molten bath by impingement of gas jets, drawing it to a point and cutting by shears, or by any other means, the cylinders then being removed from the bait in the usual way.

The advantages of the invention arise from the utilization of the expanding air independent of any blowing mechanism, resulting in great simplicity of operation and of machinery in carrying out the process, cheapening the output and resulting in uniformity of product.

What I claim is:—

1. The method of forming hollow glass articles, consisting in drawing a hollow article from a bath of molten glass around a relatively stationary column of fluid, substantially as set forth.

2. The method of forming hollow glass articles, consisting in drawing a hollow article from a bath of molten glass around a relatively stationary column of fluid, and utilizing the expansion of the fluid due to the radiated heat of the batch and cylinder-in-process, to distend the article, substantially as set forth.

3. The method of forming hollow glass articles, consisting in drawing a hollow article from a bath of molten glass around a relatively stationary column of fluid, and allowing the inclosed fluid to expand by radiated heat, substantially as set forth.

4. The method of forming hollow glass articles, consisting in lowering a bait cylinder having a bait upon the surface of molten glass and causing the bait to adhere thereto, and then drawing the bait cylinder upwardly around an air-tight abutment, substantially as set forth.

5. The method of forming hollow glass articles, consisting in lowering a bait cylinder having a bait upon the surface of molten glass and causing the bait to adhere thereto, and then drawing the bait cylinder upwardly around a stationary air-tight abutment, substantially as set forth.

6. The method of forming hollow glass articles, consisting in drawing a hollow article from a bath of molten glass around a relatively stationary column of fluid, allowing the inclosed fluid to expand by radiated heat, and exhausting excess pressure, substantially as set forth.

7. The method of forming hollow glass articles, consisting in drawing a hollow article from a bath of molten glass around a relatively stationary column of fluid, allowing the inclosed fluid to expand by radiated heat, and supplying additional fluid pressure to the column, substantially as set forth.

8. The method of forming hollow glass articles consisting in lowering a bait cylinder having a bait upon the surface of molten glass and causing the bait to adhere thereto, then drawing the bait cylinder upwardly around an air-tight abutment, and then moving the abutment, substantially as set forth.

In testimony whereof I affix my signature in presence of two witnesses.

ROGER S. PEASE.

Witnesses:
CHAS. S. LEPLEY,
C. M. CLARKE.